Jan. 9, 1968  R. D. BECK  3,362,428
VACUUM CONTROL SYSTEM WITH A RELAY VALVE CONSTRUCTION
Filed March 10, 1965  2 Sheets-Sheet 2

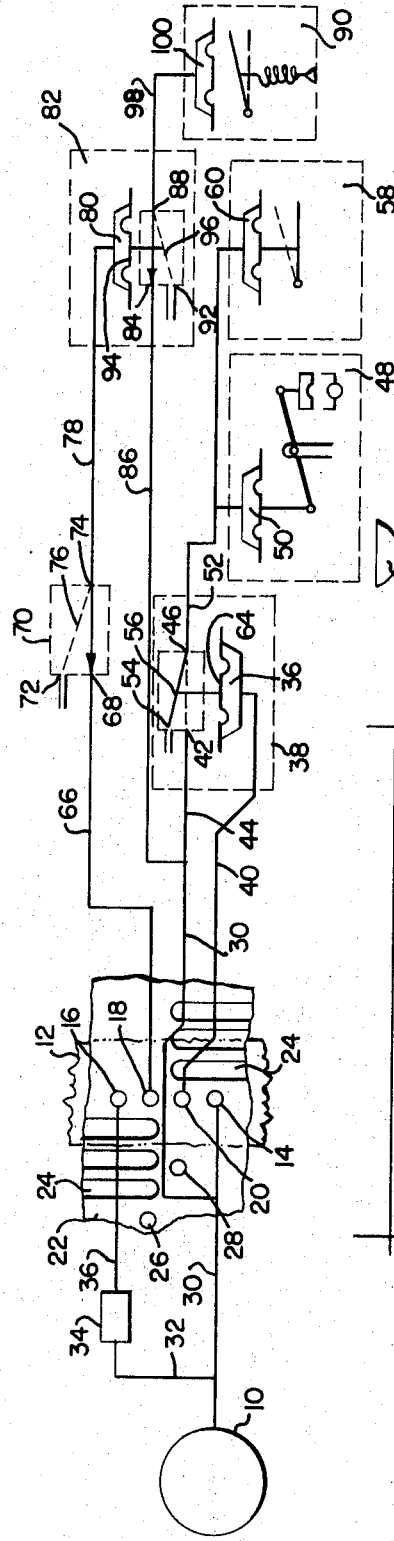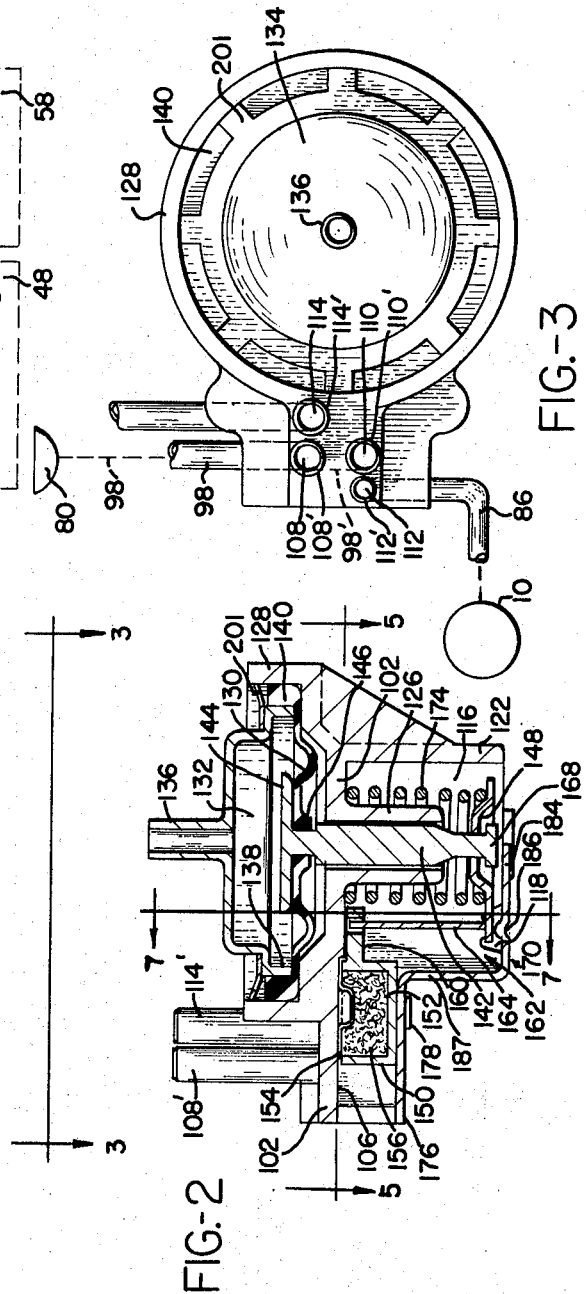

United States Patent Office 3,362,428
Patented Jan. 9, 1968

3,362,428
VACUUM CONTROL SYSTEM WITH A RELAY VALVE CONSTRUCTION
Roland D. Beck, Anaheim, Calif., assignor to Robertshaw Controls Company, Richmond, Va., a corporation of Delaware
Filed Mar. 10, 1965, Ser. No. 438,662
10 Claims. (Cl. 137—387)

ABSTRACT OF THE DISCLOSURE

This disclosure relates to a pneumatically operated control system for a washing machine or the like wherein a vacuum source is adapted to be interconnected to various vacuum operated actuators that will control the operation of the washing machine, the control system including a relay valve means that is pneumatically operated so that when the pneumatically operated valve means is interconnected to the atmosphere by the main program member, the pneumatically operated valve means will rapidly interconnect previously actuated actuators to the atmosphere to cause rapid deactuation thereof as such relay means is disposed closely adjacent such actuators.

---

This invention relates to a vacuum control system with a relay valve construction.

The vacuum control system of this invention may be used to control various components of a member to be controlled, such as an automatic washing machine. The construction is such that a source of vacuum may be connected through a timer construction with various components of the washing machine, which may be operated by vacuum operated actuators for controlling such components, such as the agitating means, the water pump, and the spin mechanism of the washing machine. These actuators may have vacuum diaphragm operated chambers of relatively large volume, so that they are not relatively quickly moved to their unactuated positions when the vacuum is to be broken in their diaphragm chambers by the operation of the vacuum controlling timer. According to this invention, relatively quick vacuum breaking relays may be interposed between the vacuum connection to said actuators, which relays may quickly introduce atmospheric air into the vacuum diaphragm chambers of such actuators, and thus quickly move such actuators to unactuated positions.

Also, an improved vacuum breaking relay is provided according to this invention, which may be used advantageously in the system of this invention.

Other features are apparent from this description, the appended claimed subject matter, and/or the accompanying drawings, in which:

FIGURE 1 is a diagrammatic representation of the vacuum control system of this invention.

FIGURE 2 is a vertical cross section of a vacuum breaking relay.

FIGURE 3 is a top view of FIGURE 2, taken from the line 3—3 of FIGURE 2.

Figure 4:
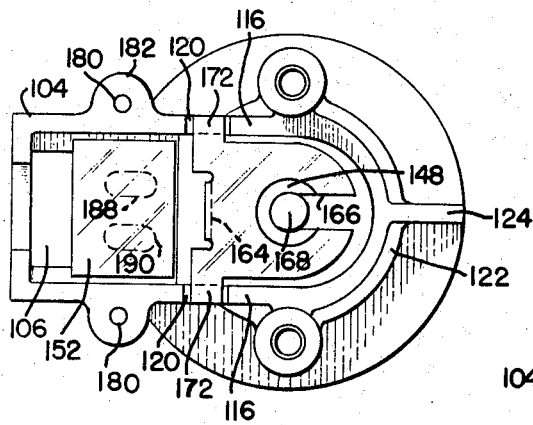
FIGURE 4 is an upward view of FIGURE 2, with the stepped bottom plate removed.

Certain words are used in this specification and in the claimed subject matter which indicate direction, relative position, or the like. These words are used for the sake of brevity and clearness of description. It is to be understood that these words are used only in connection with the illustrations in the drawings, and that, in actual use, the various parts so described may have different directions, relative positions or the like. Examples of such words are "vertical," "horizontal," "upper," "lower," etc.

The system of this invention is diagrammatically illustrated in FIGURE 1. The various components and steps are diagrammatically shown.

For example, a vacuum source or vacuum pump 10 is provided. The pump 10 may be connected with a timer reading head 12 having suction outlets 14, 16, etc., which also may have intake inlets 18, 20, etc.

The timer may also have a flexible, channeled member or thin sheet 22 movable over the reading head 12, with channels 24 joining various ones of said outlets and inlets, and with unchanneled member surfaces disconnecting the various outlets and inlets. Also, air admission ports 26 and 28, etc., may be provided in the channeled member 22 for breaking the vacuum in various ones of the openings or suction outlets and intake inlets of the reading head.

For example, a direct, vacuum transmitting connection or tube 30 may be provided from the vacuum source or vacuum pump 10 to an agitator control and pump control suction outlet 14 in the reading head.

A connection or tube 32 may be provided from the vacuum source and to a water level control 34. A connection or tube 36 may be provided from the water level control 34 to a spin controlling suction outlet 16 in the reading head 12.

The intake inlet 20 of the reading head 12 may be an agitator controlling and pump controlling intake inlet connected to a diaphragm chamber 36 of an agitator control and pump control relay valve 38, the connection being made by a vacuum line 40. The relay valve 38 may be of the type disclosed in FIGURES 2–8 of this invention, but is shown in FIGURE 1 in inverted position to avoid crowding of the lines, etc.

The relay valve 38 may have a vacuum transfer suction opening 42 connected directly to the vacuum source 10 by the line 44, 30. The relay 38 may have another vacuum transfer or vacuum intake opening 46 connected by line 52 to an agitator vacuum actuator 48, which has a vacuum actuated diaphragm chamber 50. The relay 38 may also have an atmospheric air opening 54 which is connected to the opening 46, when the diaphragm chamber 36 has its vacuum broken. Under these conditions, atmospheric air may flow from the opening 54 through the connecting channel 56 which introduces air through the line 52 to the vacuum diaphragm chamber 50 when the vacuum is broken in the relay diaphragm chamber 36.

A pump controlling vacuum actuator 58 may have a pump controlling vacuum diaphragm chamber 60, which may also be connected to vacuum pump 10, by the continuation of the line 52, so that the relay 38 controls the pump controlling actuator 58 in the same manner as it controls the agitation actuator 48. When the diaphragm chamber 60 is subjected to a vacuum the pump is operated, and when the vacuum is broken in the diaphragm chamber 50, the pump may be stopped.

It is to be seen that the diaphragm chamber 36 has a diaphragm 64 which connects the suction opening 42 to the vacuum intake opening 46 when a vacuum is applied to the chamber 36, and connects the air opening 54 to the vacuum intake opening 46 when the vacuum is broken in the chamber 36. This in turn causes a vacuum to be created in the chambers 50 and 60, when a vacuum is created in the chamber 36. Conversely, atmospheric air pressure will be produced in the chambers 50 and 60, when atmospheric pressure is produced in the chamber 36. Because of the short distance between the air opening 54 and the vacuum chambers 50 and 60, a large supply of air may be introduced into the vacuum chambers 50 and 60 without the necessity of requiring such air to pass through any long air supply line from the timer, or the like.

The intake inlet 18 of the reading head 12 may be a spin controlling intake inlet which is connected by the line 66 to a vacuum suction opening 68 of a lid valve 70. The lid valve 70 may have an air inlet opening 72 and may have a relay valve controlling opening 74. A movable connector 76 connects the suction opening 68 to the opening 74 when the lid is closed, and connects the air opening 72 to the opening 74 when the lid is opened, at which time the opening 68 is disconnected from the opening 74.

The lid valve 70 connects the openings 68 and 74 when the lid of the washing machine is closed and connects the openings 72 and 74 when the lid is open.

The opening 74 is connected by a line 78 to a diaphragm chamber 80 of a spin control relay valve 82. The relay 82 may be of the character herein disclosed in connection with FIGURES 2–8. The relay valve 82 has a vacuum transfer suction opening 84 connected directly to the vacuum source or vacuum 10 by the line 86. The relay 82 has another vacuum transfer intake opening 88 connected to a spin vacuum actuator 90. The relay 82 also has an atmospheric air opening 92.

The diaphragm chamber 80 has a diaphragm 94 which operates the channel construction 96 to connect the suction opening 84 to the vacuum intake opening 88 when a vacuum is applied to the diaphragm chamber 80. The diaphragm 94 of chamber 80 causes the connection from the air opening 92 to the vacuum intake opening 88 when the vacuum is broken in the chamber 80, by the opening of the lid of the washing machine and connection of the opening 74 to the air inlet 72. The air entering at air opening 92, and passing through opening 88 to line 98 and diaphragm chamber 100 of vacuum actuator 90 causes the spin operation to be quickly stopped when the vacuum is produced in the diaphragm chamber 100. Thus when the washing machine lid is opened, the lid valve air opening 72 is opened quickly to admit air first into the vacuum chamber 80, and then through the inlet 92 to the chamber 100, quickly to stop the spin.

However, when the lid is closed, the spin operation can be energized by vacuum control of the timer from opening 18, line 66, openings 68, 74, line 78, and vacuum chamber 80. This connects relay opening 84 to opening 88, so that a vacuum is supplied from vacuum pump 10, through lines 30 and 86, openings 84, 88, line 98, to vacuum chamber 100 to actuate the actuator 90 to produce the spin operation.

It is thus to be seen that a vacuum system has been provided in which relay valves 38 and 82 provide a quick air introduction into the vacuum chambers 50, 60, and 80 of the agitation actuators 48, pump actuator 58, and spin actuator 90 respectively. This provides a quick and effective stopping action when required.

The foregoing description has been made mainly in connection with the various parts illustrated in FIGURE 1.

The relay valves 38 and 82 of FIGURE 1 may be relay valves of the construction shown in FIGURES 2–8 of this application.

Accordingly, certain parts of FIGURES 2–8 of this application may be identical with certain parts indicated in FIGURE 1. However, in order to avoid unnecessary involvement of description between FIGURE 1 and FIGURES 2–8, entirely independent reference numerals will be applied to the various parts of FIGURES 2–8. However, it remains obvious that certain parts of FIGURES 2–8 are applicable to, and may be incorporated in, the construction described in FIGURE 1.

In FIGURES 2–8, the relay valve disclosed therein may have a relay horizontal central plate 102 which may be a part of an integral, molded or cast relay body construction.

A pair of downward vertical parallel short walls 104 may be integral with the central plate 102. The lower surface 106 of the plate 102, between the short walls 104, forms an inverted vacuum reading head surface with vacuum transferring openings 108, 110, and 112, and atmospheric air opening 114 extending upwardly from such reading head surface 106. These openings may be connected with vertical tubes for further connection with connecting lines, such as tubes 108′, 110′, 112′, and 114′, which may be upward extensions of such openings 108, 110, 112, and 114, just described. Tubes 108′ and 114′ are visible in FIGURE 2 and tubes 108′, 110′, 112′, and 114′ are visible in FIGURE 3.

A pair of vertical, downward parallel long walls 116 may be integral with the plate 102 and integral with respective ones of the short walls 104. The bottoms 116′ of the walls 116 may each have an upward bell crank pivot notch 118 with an inverted pivot arch 120, FIGURE 6. The purposes of these notches and these arches 120 are further described elsewhere.

A vertical, arched, long wall 122 is integral with the plate 102 and is integral with and joins the parallel long walls 116. If desired, the arched wall 122 may be reinforced by a vertical web 124.

A downward, vertical plunger tube 126 is integral with the plate 102 and extends downwardly between the long walls 116.

An integral relay vacuum chamber forming upward wall 128 extends upwardly from the central plate 102 above the plunger tube 126. A flexible diaphragm 130 may be located inside wall 128 and may form a part of a vacuum chamber 132. A dome shaped vacuum chamber cover 134 may be provided with an upward suction tube 136 and with a downward rim 138. The rim 138 holds down and seals the rim 140 of the diaphragm 130 against the upward wall 128 and against the horizontal plate 102.

The vacuum cover 134, FIGURE 2, may be held in the upward wall 128, which may be a circular wall, by a self-locking retaining resilient ring 201 which can lock itself against the inside surface of the wall 128.

A plunger 142 may be connected to the diaphragm 130 by a notch and adjacent plate 144, which holds the central bead 146 of the diaphragm 130. The plunger 142 extends downwardly through the plunger tube 126 for engagement with a horizontal arm 148 of a bell crank lever to be described.

A horizontally reciprocable, slidable, valve support 150 may have the shape of a rectangular sided cup with a flat bottom 152. An upper, thin, flexible, channeled valve control member 154 may be secured at the upper rim of the support 150. A pressure pad 156 may be placed inside the cup-shaped support 150. The pad 156 may be made of any flexible porous material, such as porous rubber and the like. The member 154 may be upwardly pressed by the pad 156, and such member 154 may be slidable against the inverted reading head surface 106.

The channel member 154, which may hereafter be called a "membrane" for brevity, may have a channel construction 158 which connects and disconnects the upward openings 108, 110, 112 and 114 as the valve support 150 is reciprocated. The details of the channel construction 158 are elsewhere more fully described.

The support 150 may have a bell crank lever arm receiving extension 160 by which it is reciprocated. A bell crank lever 162 may have an upward vertical arm 164 (upward in FIGURE 2, and downward in the inverted FIGURE 6). The arm 164 may extend into a suitable slot in the arm receiving extension 160, so that the swinging action of the arm 164 causes horizontal reciprocation of the support 150 and of the channeled membrane 154.

Figure 6:
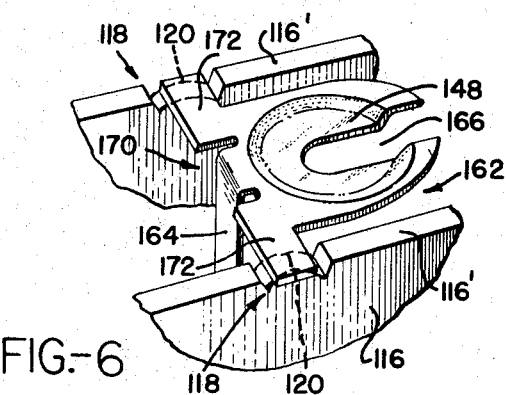
FIGURE 6 is a bottom perspective view of certain parts of FIGURE 2.

The bell crank lever 162 also has a horizontal arm 148 having an arm notch 166, FIGURE 6, connected to the lower end of the plunger 142 by means of the button 168, FIGURE 2, which button 168 pulls the horizontal arm 148 upward, when the plunger 142 is pulled upwardly by the diaphragm 130 when a vacuum is created in the cavity 132.

The horizontal arm 148 is connected to the vertical arm 164 by a pivot junction 170 which has outward flat pivot extensions 172, FIGURE 6, which are pivoted in the pivot notches 118 and which rock on the inverted pivot arches 120. The extensions 172 may be flat extensions which have been cut from the original flat piece from which the bell crank lever 162 has been cut and press formed.

A coil spring 174 surrounds the plunger tube 126 and has its upper end engaging the under surface of the central plate 102 and has its lower end engaging the bell crank horizontal arm 148.

A stepped bottom plate has an upper step 176 secured to the bottoms of the short walls 104 by means of screws 178, which screws may extend into openings 180 in bushings 182, which bushings may be integral with the short walls 104.

Figure 7:
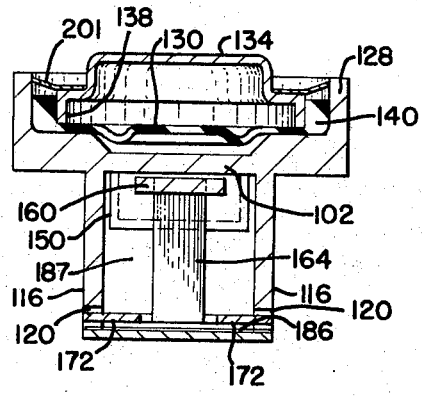
FIGURE 7 is a vertical cross section taken along the line 7—7 of FIGURE 2.

The upper step 176 of the stepped bottom member provides a slide surface upon which the flat valve bottom 152 of support 150 can reciprocate. The bottom plate also has an oppositely directed bottom step or flange 184 which has an upward ridge 186, FIGURES 2 and 7, struck thereon and which may extend completely across and under the side walls 116, as shown in FIGURE 7. The ridge 186 forms a bottom pivot point for the pivot extensions 172 of the bell crank lever. The steps 176 and 184 are joined by an intermediate vertical plate 187.

Figure 5:
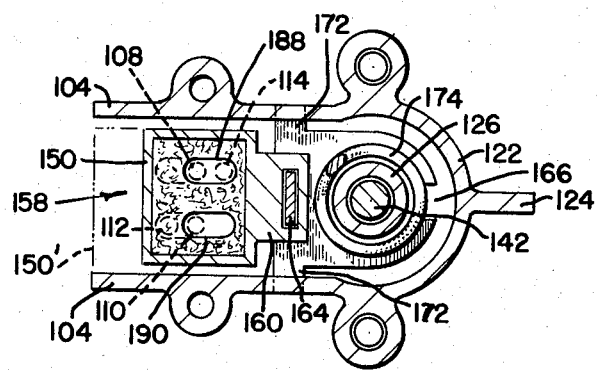
FIGURE 5 is a horizontal cross section taken generally along the line 5—5 of FIGURE 2.

The channel construction 158 may include two permanently formed parallel channels or "blisters" 188 and 190 formed in the membrane 154, FIGURE 5. In the most rightward position of the support 150, as shown in FIGURES 2 and 5, the channel 188 connects the upward openings 108 and 114, FIGURE 5, so that atmospheric air from the opening 114 will flow across the channel 188 and into the opening 108, and from there such atmospheric air will flow through the connection 52 or 98, FIGURE 1, to the vacuum chamber 50, 60, or 80, to place these vacuum chambers under atmospheric pressure. (Connection 98 of FIGURE 1 is indicated in FIGURES 3 and 8.)

The connection 98, or 52, as the case may be in FIGURE 1, may have an extension 98', indicated in FIGURE 3, which is also connected to the tube of the opening 110, FIGURE 3. In the full line position of the channel 190, FIGURE 5, channel 190 is connected only with the opening 110, so that no vacuum or other disturbing pressure will be applied to the connecting line 98' of FIGURE 3, as long as the support 150 is in the full line position of FIGURE 5. However, when the support 150 is moved leftward, in FIGURE 5, to the dotted line position 150', then the channels 188 and 190 also move leftward to the dotted line positions where the channel 188 is connected only to the opening 108, and therefore cannot transmit any vacuum or air. On the other hand, the channel 190 will be moved to the left dotted position, so that it is under and joins the openings 110 and 112. The opening 112, FIGURE 3, may be connected to a tube which is the equivalent of tube 86, or tube 44, of FIGURE 1. (Tube 86 is indicated in FIGURE 3.) Such tube 86, or 44, is connected by the connection 30 with the vacuum pump 10, in FIGURE 1.

It is therefore to be seen that reciprocation of the valve support 150 reciprocates one of the channels, such as 188 to connect and disconnect an actuator opening 108 with an atmospheric air opening 114. At the same time, the other channel 190 connects and disconnects the vacuum suction opening 112, and the actuator opening 110. However, the channel 188 is effective only when it is at its most rightward position, and the channel 190 is effective only when it is at its most leftward position, with reference to FIGURE 5.

Figure 8:
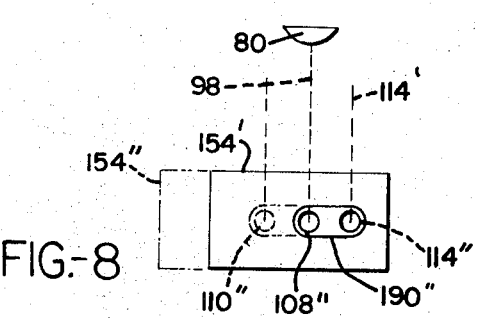
FIGURE 8 is a diagrammatic top view of another embodiment of the flexible channeled valve control member.

In the embodiment of FIGURE 8, the channel construction 190'' is a single channel extending in the direction of reciprocation of the valve support and of the membrane 154'. When the membrane 154' is in its most rightward position, the channel member 190 connects the atmospheric opening 114'' and the vacuum actuator opening 108''. The channel member 190 is not long enough at the same time to connect with the vacuum suction opening 110''. However, when the membrane 154' is moved leftward, to its most leftward dotted position 154'', then the channel 190 will connect the openings 108'' and 110'' and will disconnect the opening 114''. Therefore, the channel member 190 connects an actuator opening 108'' and atmospheric air opening 114'' in one channel position, and connects a vacuum suction opening 110'' and the said actuator opening 108'' in another position of the channel 190'.

It is thus to be seen that a novel, useful and unobvious vacuum control system with relay valve construction have been provided.

While the form of the invention now preferred has been disclosed as required by the statutes, other forms may be used, all coming within the scope of the claims which follow.

What is claimed is:

1. In combination: a vacuum source; a vacuum controlling timer with a reading head having suction outlets and intake inlets, and with a channeled member movable over said reading head with channels joining various ones of said outlets and inlets and with unchanneled surfaces disconnecting said various of said outlets and inlets, said channeled member having air admission ports breaking the vacuum in various of said inlets; a direct connection from said vacuum source to an agitator control and pump control suction outlet; an agitator control and pump control intake inlet connected to a diaphragm chamber of an agitator control and pump control relay valve, said relay valve having a vacuum transfer suction opening connected directly to said vacuum source and having a vacuum transfer vacuum intake opening connected to an agitator vacuum actuator and a pump vacuum actuator, and having an atmospheric air opening, said diaphragm chamber having a diaphragm with means connecting said suction opening to said vacuum intake opening when a vacuum is applied to said diaphragm chamber and connecting said air opening to said vacuum intake opening when the vacuum is broken in said diaphragm chamber; a water level control; a connection from said vacuum source to said water level control; a connection from said water level control to a spin controlling suction outlet; a lid valve; a spin controlling intake inlet in said reading head connected to a vacuum suction opening of said lid valve, said lid valve having an air inlet opening and having a relay valve controlling vacuum opening, said last named suction opening and relay controlling opening being connected when said lid is closed, and said air opening and said relay controlling opening being connected when said lid is open, said controlling vacuum opening being connected to a diaphragm chamber of a spin control relay valve, said relay valve having a vacuum transfer suction opening connected directly to said vacuum source and having another vacuum transfer vacuum intake opening connected to a spin vacuum actuator and having an atmospheric air opening, said diaphragm chamber having a diaphragm with means connecting said suction opening to said vacuum intake opening when a vacuum is applied to said diaphragm chamber and connecting said air opening to said vacuum intake opening when the vacuum is broken in said diaphragm chamber.

2. A combination according to claim 1 in which said channel construction includes a channel extending in the direction of reciprocation of said valve support, said channel connecting an actuator opening and an atmospheric air opening in one channel position, and connecting a vacuum suction opening and said actuator opening in another channel position.

3. A combination according to claim 1 in which said plunger has a button at its lower end which upwardly pulls said horizontal bell crank arm when said plunger is pulled upwardly by vacuum action on said diaphragm.

4. A combination according to claim 1 in which said vacuum cover is held in said upward wall by a self locking retaining ring.

5. A combination according to claim 1 in which a stepped plate has an upper step supporting the bottom of said valve support, a lower step holding said pivot extensions in said pivot notches, said stepped plate being secured to some of said downward walls.

6. A pneumatic control system comprising a pneumatic source, a pneumatically operated actuator movable to a first position when fluidly connected to said source and movable to a second position when fluidly connected to the atmosphere, first passage defining means for interconnecting said source to said actuator, a pneumatically operated valve means in said passage means having a first position to permit fluid flow between said source and said actuator and a second position to prevent said fluid flow between said source and said actuator while fluidly connecting said atmosphere to said actuator, second passage means for fluidly connecting and disconnecting said source to and from said valve means to move the same to said first position thereof when connected to said source and to move the same to said second position thereof when disconnected from said source, and a program means for interconnecting and disconnecting said source to and from said first and second passage means in a predetermined sequence.

7. A pneumatic control system as set forth in claim 6 wherein said valve means comprises a movable tape valve member.

8. A pneumatic control system as set forth in claim 6 wherein said program means comprises a tape valve member.

9. A pneumatic control system as set forth in claim 6 wherein said source is a vacuum source.

10. A pneumatic control system as set forth in claim 6 wherein said pneumatically operated valve means includes a flexible diaphragm.

References Cited

UNITED STATES PATENTS 3,112,630 12/1963 Anderson _____ 137—387 X
3,124,145 3/1964 Egle _____ 134—57

WILLIAM F. O'DEA, *Primary Examiner.*

D. R. MATTHEWS, *Assistant Examiner.*